Figure 1:
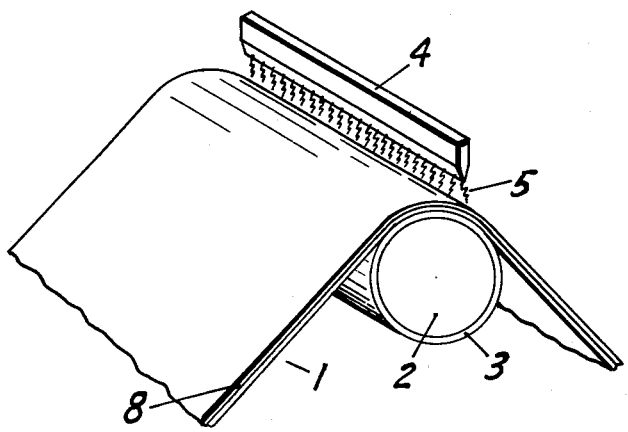

March 15, 1966   L. H. REINKE   3,240,933
ELECTROSTATIC TREATMENT OF SILICONE RELEASE COATINGS
Filed Nov. 26, 1962

INVENTOR.
LESTER H. REINKE
BY Robert F. Fleming Jr.

ATTORNEY

United States Patent Office 3,240,933
Patented Mar. 15, 1966

3,240,933
ELECTROSTATIC TREATMENT OF SILICONE RELEASE COATINGS
Lester H. Reinke, Midland, Mich., assignor to Dow Corning Corporation, Midland, Mich., a corporation of Michigan
Filed Nov. 26, 1962, Ser. No. 240,013
2 Claims. (Cl. 250—49.5)

The treatment of paper to prevent other substances from adhering to it is well known. One of the substances used in such treatment of paper is a film of cured polydimethylsiloxane which has been formed on the surface. The application of such films to paper is well known and is disclosed, for example, in U.S. Patent 3,061,567. These films may be cured by the use of catalysts such as the metal salts of carboxylic acids of which lead octoate, dibutyltindiacetate, dibutyltindilaurate, zinc octoate, ferric octoate, ferric naphthenate and cobalt naphthenate are examples. Also, silicates may be employed as a cross-linking agent for the polydimethylsiloxane films.

These films of polydimethylsiloxane are excellent release agents, that is they prevent other substances from adhering to the paper to which they have been applied. This low release force is highly desirable when one is trying to remove materials such as frozen foods, asphalt, resins, pitch, sticky gums and rubbers, and other adhesive materials from the paper. However, when these polydimethylsiloxane release agents are used in such applications, as removal of decalcomanias from paper, the release force is so low that problems arise, such as release of the decalcomanias during handling and shipping.

This invention relates to a method of controlling the release properties of cured polydimethylsiloxane films. More particularly, this invention relates to a method of treating a release film of cured polydimethylsiloxane by subjecting it to the action of a corona or electrostatic discharge for a sufficient time to increase its release value by at least 10 g. per inch, but to a value not more than 700 g. per inch. By subjecting the polydimethylsiloxane films to the action of an electrostatic or corona discharge applicant has found that he can control the release properties of the films. While either electrostatic or corona discharge may be employed for treating the polydimethylsiloxane film, the use of corona discharge is preferred since it is believed to give a more uniform treatment. By modifying the release properties of the films in this manner applicant has found that they can be used in such applications as the release of decalcomanias from paper with good results, but without the aforementioned problems. The treatment of this invention may also advantageously be used where release papers are applied to opposite sides of an adhesive material where it would be desirable to have different amounts of adhesion for each release paper. This would permit the removal of one paper first, applying the exposed adhesive to the desired surface and then removing the other paper.

The amount of corona discharge treatment that one employs will be determined by the ultimate release value desired. The degree of treatment can be controlled in several ways. For example, the degree of treatment can be controlled by the number of times the paper is passed under the electrode, by varying the amount of current employed or by passing the paper under a series of electrodes. Thus, the ultimate release value is a matter of individual choice and will vary from one particular application to another.

The application of the electrostatic or corona discharge treatment to the polydimethylsiloxane coated paper may be accomplished in any suitable manner. For example, the paper may be laid on a conducting metal plate and an electrode passed over the paper, the paper being treated when discharge takes place between the electrode and the plate. This treatment may also be accomplished by passing the polydimethylsiloxane coated paper on a moving metal belt or roll under a stationary electrode, the treatment being accomplished as the paper passes under the electrode. In this instance the metal belt serves as the other electrode. It is highly desirable that the metal plate, belt or roll be coated with a suitable dielectric material such as glass, Mylar (a polyester film of polyethylene terephthalate resin) or resin-reinforced laminate. However, such a coating is not essential. It is also possible to coat the electrode above the paper with the dielectric material. More than one electrode may also be used above the paper if so desired. The electrode above the paper may take many different shapes. It may be in the form of a rod (i.e., cylindrical), in the form of a bar having a knife edge which extends downward toward the paper, or it may be in the form of a plate. Either an alternating or direct current may be employed for obtaining the discharge, but alternating current is preferred since it is readily available.

The figures in the drawing are all perspective views of illustrative embodiments of the invention.

FIGURE 1 shows a paper 1, which contains a film of cured polydimethylsiloxane 8 on its upper surface, passing over a metal roll 2 which contains a coating 3 of a suitable dielectric material. At the same time as the paper passes over the metal roll it also passes under a bar electrode 4 which has a knife edge that extends downward toward the paper and roll. Both the bar electrode and the metal roll are connected to a suitable electrical source not shown. Corona discharge 5 takes place between the bar electrode and the metal roll which serves as the other electrode, thus, treating the cured film of polydimethylsiloxane on the paper.

Figure 2:
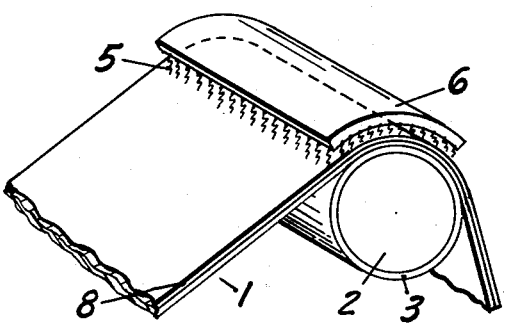

FIGURE 2 shows a paper 1, which contains a film of cured polydimethylsiloxane 8 on its upper surface passing over a metal roll 2 which contains a coating 3 of a suitable dielectric material. At the same time as the paper passes over the metal roll it also passes under an electrode 6 which is in the form of a curved plate. Both the metal plate electrode and the metal roll are connected to a suitable electrical source not shown. Corona discharge 5 takes place between the lower surface of the plate electrode and the metal roll which serves as the other electrode, thus treating the cured film of polydimethylsiloxane on the paper.

Figure 3:
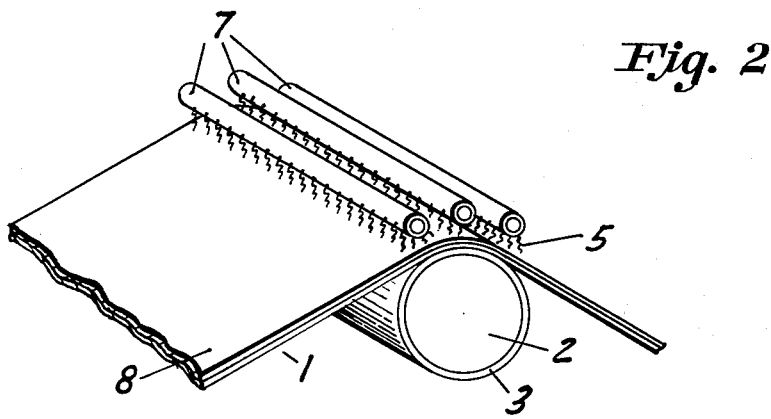

FIGURE 3 shows a paper 1, which contains a film of cured polydimethylsiloxane 8 on its upper surface, passing over a metal roll 2 which contains a coating 3 of a suitable dielectric material. At the same time as the paper passes over the metal roll it also passes under a series of glass jacketed electrodes 7. The glass jacketed electrodes and the metal roll are connected to a suitable electrical source not shown. Corona discharge 5 takes place between the glass jacketed electrodes and the metal roll which serves as the other electrode, thus treating the cured film of polydimethylsiloxane on the paper.

The paper treatment can be incorporated into the production line at some point after the film of polydimethylsiloxane has been applied and cured, if so desired, or the treatment can be applied to individual pieces of paper having a cured film of polydimethylsiloxane on them.

In the tests conducted that are set forth in the following examples, a corona discharge apparatus that was fabricated in the Saran Development Laboratory of Dow Chemical Company was employed to treat the paper. This apparatus uses an Ignation transformer made by the Jefferson Electric Company (No. 218226). The transformer has a 110 volt primary coil and a 10,000 volt secondary coil, producing an output current of 23 milliamperes. This output is connected to a 6 inch by 12 inch stainless steel plate covered by a Mylar film and to a movable bar 5/8 inch in diameter and 7 inches long which is suspended about 1/16 inch above the plate. It requires approximately 6 seconds for the bar to make one 10 inch pass over the plate.

The paper to be treated was placed on the metal plate of the above described apparatus with the side containing the polydimethylsiloxane film up and the bar was passed back and forth over the paper for the desired number of passes. The release properties of the paper thus treated were then determined as follows: A strip of one-inch wide medical adhesive tape was placed against the treated surface of the paper, the tape was then pulled at an angle of 180° to the surface of the paper at a rate of 12 inches per minute. The force required to do this was determined by the means of a spring balance and is expressed as grams per inch width of tape. The tests were conducted on a Keil tester which is described in Tappi, vol. 43, No. 8, pages 164A and 165A (August 1960).

In each of the following examples the paper contained a cured film of polydimethylsiloxane. Such papers are well known articles of commerce. As can be seen from the following examples, by varying the amount of corona discharge treatment (i.e., the number of passes) one can control the release properties of the paper.

*Example 1*

GLASSINE PAPER

| No. of Passes | Release value (g./in.) | |
|---|---|---|
| | Without aging paper after treatment | After standing 4 wks. after treatment |
| 0 | 30 | 20 |
| 1 | 30 | 45 |
| 2 | 90 | 85 |
| 4 | 230 | 175 |
| 6 | 275 | 175 |
| 10 | 375 | 260 |
| 20 | 455 | 250 |

*Example 2*

KRAFT PAPER

| No. of Passes | Release value (g./in.) | |
|---|---|---|
| | Without aging paper after treatment | After standing 4 wks. after treatment |
| 0 | 5 | 15 |
| 1 | 135 | 65 |
| 2 | 255 | 125 |
| 4 | 385 | 185 |
| 6 | 455 | 210 |
| 10 | 555 | 280 |
| 20 | 650 | 325 |

*Example 3*

PARCHMENT PAPER

| No. of Passes | Release value (g./in.) | |
|---|---|---|
| | Without aging paper after treatment | After standing 4 wks. after treatment |
| 0 | 25 | 30 |
| 1 | 115 | 45 |
| 2 | 230 | 70 |
| 4 | 255 | 120 |
| 10 | 315 | 215 |
| 20 | 375 | 305 |

That which is claimed is:

1. A method of treating a film of cured polydimethylsiloxane which comprises subjecting said film to the action of a corona discharge for sufficient time to increase its release value by at least 10 g. per inch, but to a value not greater than 700 g. per inch.

2. A method of treating a film of cured polydimethylsiloxane which comprises subjecting said film to the action of an electrostatic discharge for sufficient time to increase its release value by at least 10 g. per inch, but to a value not greater than 700 g. per inch.

References Cited by the Examiner

UNITED STATES PATENTS

| 2,802,085 | 8/1957 | Rothacker | 250—49.5 |
| 2,859,480 | 11/1958 | Berthold et al. | 250—49.5 X |
| 2,881,470 | 4/1959 | Berthold et al. | 250—49.5 X |
| 2,922,883 | 1/1960 | Giaimo | 250—49.5 |
| 2,923,964 | 2/1960 | Plonsky | 250—49.5 X |

RALPH G. NILSON, *Primary Examiner.*